UNITED STATES PATENT OFFICE.

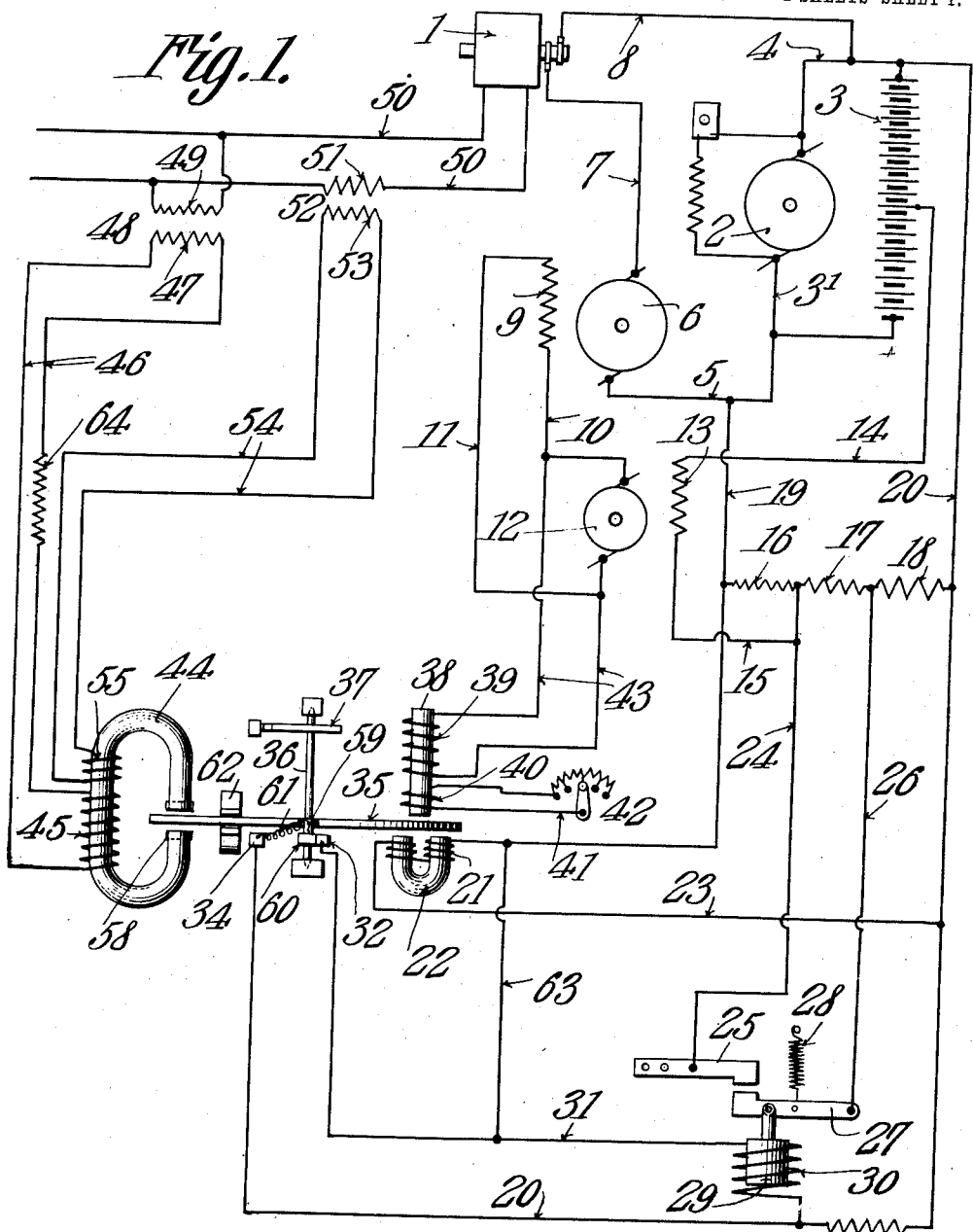

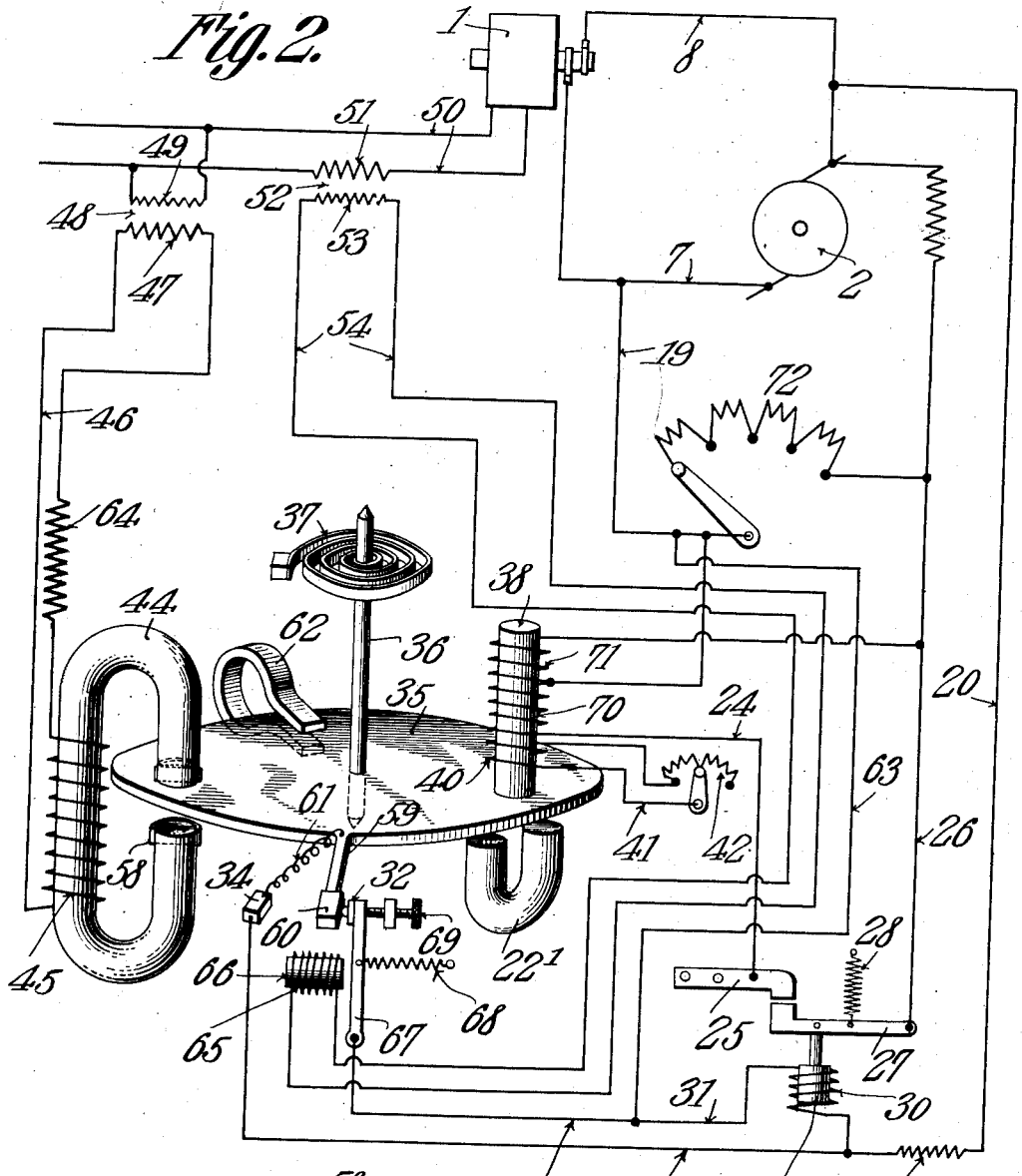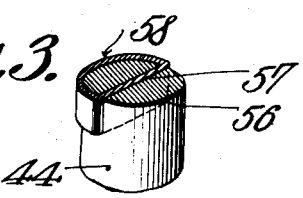

FORREST E. RICKETTS, OF BALTIMORE, MARYLAND.

ELECTRIC REGULATOR.

1,096,754.

Specification of Letters Patent. Patented May 12, 1914.

Application filed April 15, 1909. Serial No. 490,059.

*To all whom it may concern:*

Be it known that I, FORREST E. RICKETTS, a citizen of the United States, residing at Baltimore, State of Maryland, have invented a new and useful Electric Regulator, of which the following is a specification.

This invention has reference to improvements in electric regulators especially adapted for controlling the field current of an alternating current generator in response to variations of the electric conditions in the armature circuit.

It is the object of the present invention to reduce to the lowest minimum the fluctuations of the current characteristic in the armature circuit utilized to cause the operation of the regulator.

In accordance with the present invention the field current of the generator is controlled by means of an automatic switch adapted to interrupt a circuit through which there flows a very small current which circuit controls the voltage of the exciting system.

The controlling means has a certain inertia and therefore is correspondingly sluggish in its movement unless some means be provided for overcoming the inertia of the controlling means so that the forces generated by the fluctuations in the armature circuit of the generator have practically no inertia resistances to overcome and therefore the response of the regulator to the current fluctuations is practically instantaneous.
Suppose for instance that the voltage of the armature circuit of the generator should rise. If the inertia of the regulating means has to be overcome before the regulator will actively respond to meet the rising potential in the armature circuit of the generator, then the rise of potential may be considerable before the regulator will check it. The same is true when the voltage or potential of the armature circuit falls. The result of this is that there may be marked surges of current in the armature circuit of the generator due to the lack of sensitive responsiveness of the controlling devices.

With the present invention provision is made for imparting to the controlling devices impulses tending to actuate the movable members of the controlling devices so that the inertia of these devices is practically overcome when the current fluctuations begin to act so that a fluctuation impulse totally inoperative to a regulator where in-
ertia must be overcome, will cause the ready response of the regulator and the control of the field of the generator before the fluctuations become at all pronounced. The result is that the voltage in the leads of the armature of the generator is maintained noticeably constant.

The invention will be best understood from a consideration of the following detail description taken in connection with the accompanying drawings forming a part of this specification, in which drawings, Figure 1 is a diagram of a portion of an electric generating system with the controlling means of the present invention incorporated. Fig. 2 is a similar view showing a somewhat different arrangement of the controlling means of the present invention. Fig. 3 is a detail view showing a portion of a magnet used in connection with the controlling system.

Referring to the drawings there is shown a generator 1 in which it is assumed that the armature is the stator and the field is the rotor. The field current is furnished by means of any suitable source of electricity and in the system illustrated this current is furnished by a dynamo 2 supplemented by a battery 3. One side, say the positive side, of the dynamo or exciter 2 is connected to an exciter main 3' while the other side is connected to another exciter main 4. The exciter main 3' is connected by a conductor 5 with one terminal of a current source indicated as a dynamo 6 and the other terminal of this dynamo is connected to a conductor 7 leading to one side, say the positive side of the field of the generator 1. The negative side of the field of the generator 1 is connected by a conductor 8 to the negative exciter main 4. The dynamo 6 has a stationary field magnet 9 connected by conductors 10 and 11 to a suitable current source shown as a dynamo 12 acting as an exciter. The dynamo 12 is provided with a stationary field 13 having one side connected by a conductor 14 to an intermediate point of the battery 3 and the other side of this field magnet 13 is connected by a conductor 15 to the common point of two resistances 16 and 17. Connected to the resistance 17 is another resistance 18 and these three resistances are connected in series across two conductors 19 and 20, one leading from the negative exciter main 4 and the other from the conductor 5. The conductor 19 is carried to the coils 21 of a horse-shoe electromagnet 22 and from these coils there leads a conductor 23 to the conductor 20.

The intermediate point of the two resistances 16 and 17 are connected by the conductor 15 and by another conductor 24 leading from the conductor 15 to a contact 25. The intermediate point of the two resistances 17 and 18 is connected by a conductor 26 to one end of a pivoted terminal 27 normally constrained toward the terminal 25 by a spring 28. The terminal 27 is connected to the core 29 of a solenoid 30 which latter is included in a conductor 31 connected at one end to a terminal 32 and at the other end to the conductor 20 which latter between the point of connection of the conductor 31 therewith and the battery 3, includes a resistance 33. The conductor 20 is carried to a terminal 34 adjacent to the terminal 32. There is provided a rotatable disk 35 of non-magnetic metal, preferably aluminum, mounted on an arbor 36 preferably provided with pointed bearing ends to reduce friction to a minimum and this disk is under the normal control of a spiral spring 37 tending to move the disk in one direction. The horse-shoe magnet 22 has its polar ends in inductive relation to the disk 35 on one face thereof and equi-distantly disposed from the axis of the disk. In inductive relation to the other face of the disk at a point midway between the polar ends of the magnet 22 is another magnet 38 of the bar type and having one polar extremity only adjacent to the face of the disk 35. The poles of the magnet 22 and the poles of the magnet 38 near the disk are so arranged that the magnetic fields extending out from the poles pass through the disk at angles to the plane of oscillation of the disk. By this arrangement the disk is caused to oscillate whenever the strength of the field of the magnet 38 is varied, the direction of the oscillation depending upon the manner in which the field of the magnet 38 is varied. The magnet 38 is wound with two coils 39 and 40, the terminals of the coil 40 being connected by conductors 41 to the two terminals of a rheostat 42. The coil 39 is bridged across the conductors 10 and 11 by conductors 43. In inductive relation to the disk 35 with the poles on opposite sides of the disk is a magnet 44, the magnet being so shaped as to embrace the disk with the polar extremities oppositely disposed in line one with the other. The magnet 44 carries a coil 45 connected by conductors 46 to the terminals of the secondary 47 of a transformer 48 the primary 49 of which is bridged across the armature leads 50. In series with one of the armature leads 50 is the primary coil 51 of a transformer 52, the secondary winding 53 of which is connected by conductors 54 to another coil 55 on the magnet 44. The polar extremities of the magnet 44 are each formed with a diametric slot 56 in which is seated the diametric portion 57 of a band 58 half encircling the respective polar extremity of the magnet 44, the band 58 with its diametric portion 57 forming a single turn closed circuit.

The disk 35 carries a radial arm 59 best shown in Fig. 2 and at the extremity of this arm is a contact 60 normally constrained by the spring 37 to engage the circuit terminal 32 before referred to. Either the disk 35 or the arm 59 is connected by a flexible conductor 61 with the terminal 34. There is also provided a permanent magnet 62 with the polar extremities embracing the disk 35 in close relation thereto to prevent continued oscillations of the disk when once set in motion. Let it be assumed that the disk 35 has been moved by the spring 37 until the contact 60 is against the circuit terminal 32, thereby short circuiting the magnet 30 and allowing the spring 28 to bring contact 27 into engagement with contact 25, then current will flow from the middle point of the battery 3 through the conductor 14, field coil 13 and conductor 15 to the common point of the resistances 16 and 17 and this will cause the dynamo 12 to generate a voltage in one direction which may be taken as a positive voltage, being in the direction to raise the voltage of the system. When, however, the contacts 60 and 32 separate, the magnet 30 will become energized and cause the contacts 25 and 27 to separate then the sum of the resistances 17 and 18 will be greater than the resistance 16 and current will flow from the junction of the resistances 16 and 17 through conductor 15 field coil 13 and conductor 14 to the middle point of 13 and conductor 14 to the middle point of the battery thus causing the dynamo 12 to generate a voltage in the opposite direction or in a direction to lower the voltage of the system, and this may be called a negative voltage. Current flows from the positive exciter main 5 through the conductor 19 thence by a branch conductor 63 to the conductor 31 thence through the solenoid coil 30 and by way of the resistance 33 and conductor 20 back to the negative side of the exciter circuit. The resistance 33 prevents too great a flow of current when the contact 60 is brought into engagement with the circuit terminal 32 and thereby the solenoid coil 30 is short circuited. When the circuit terminals or contacts 32 and 60 are in engagement then the coil 30 is short-circuited and the spring 28 becomes active to close the circuit controlled by the contacts 25 and 27. When the terminal 60 is moved away from the terminal 32 then current flows through the coil 30 and the contact 27 is moved out of engagement with the contact 25 against the tendency of the spring 28.

The coil 45 on the magnet 44 is energized by current inductively generated in the secondary 47 of the transformer 48 while the current flowing through this coil 45 is kept in phase with the voltage in the secondary 47 of the transformer 48 by a resistance 64 introduced into one of the conductors 46. The energization of the coil 45 is of course in proportion to the voltage at the mains 50. The coil 55 on the magnet 44 is energized by current inductively generated in the secondary 53 of the transformer 52 and is proportional to the current flowing through the mains 50. Therefore the magnetism produced in the magnet 44 is the result of the magnetism produced both by the voltage and current elements of the armature circuit of the main generator 1. The current supplied to the coils 45 and 55 being alternating in character will produce a magnetic flux in the magnet 44 which is constantly changing its direction. This variation of flux will induce a current in the conductor 58 at the polar extremities of the magnet 44 which will tend to delay the magnetism of that portion of the polar extremities embraced by these conductors. The magnetic flux will also induce a current in the disk 35 through which the flux passes. This induced current will lag behind the magnetism of the magnet 44 and will produce a magnetic pole on either side of the disk which will be unlike the nearest pole of the magnet 44. Since the magnetism of the portion of the poles embraced by the conductors 58 and the resultant poles on the surface of the disk lag behind the influencing magnetism they will be simultaneous. There will be a mutual attraction between the poles on the disk and the embraced poles and the disk will tend to rotate toward the embraced portion of the poles which in the system illustrated will move the contact 60 away from the contact 32.

The coils 21 of the magnet 22 may receive current from any suitable source and in the system illustrated this source is the battery 3 which may be a storage battery, and the exciter 2 in parallel. The magnet 22 is so wound that the poles are unlike. The coil 39 of the magnet 38 receives current from a source of direct current the potential of which is controlled by the rotation of the disk 35. This current is supplied in the system illustrated by the dynamo 12 through the conductors 43. As will hereinafter appear the polarity of the dynamo 12 is constantly reversing.

The coil 40 is in inductive relation to the core of the magnet 38 and is included in a circuit having the adjustable resistance 42 included therein and the function of this coil is to vary the lag of the magnetism in the magnet 38. Since the voltage supplied to the coil 39 is constantly reversing the magnetism of the magnet 38 is constantly passing through the zero value. The variation of this magnetism induces a current in the disk 35 which in turn produces a resultant magnetism generating a pole on the surface of the disk near the adjacent pole of the magnet 38 which is unlike that pole and also a pole on the opposite sides of the disk which is like the said pole. These resultant poles lag behind the magnetism of the magnet 38 and as the poles of the magnet 22 have a constant value and are unlike, one of the poles of the magnet 22 will attract and the other will repel the resultant pole on the surface of the disk thereby tending to turn the disk in one direction when the magnetism of the magnet 38 passes through zero after having been magnetized in one direction and tending to turn the disk in the other direction when the magnetism of the magnet 38 passes through zero value after having been magnetized in the other direction. Therefore the magnet coil 39 may be so connected to the terminals of the dynamo 12 that the disk 35 will receive an impulse in the direction to open the contacts 32 and 60 when the polarity of the booster is changing from negative to positive and in the direction to close them when the polarity of the dynamo 12 is changing from positive to negative. By varying the lag of the current in the magnet 38 by suitably varying the resistance 42 the impulses imparted to the disk may be varied as to time relative to the time of zero voltage of the dynamo 12. It is to be noted that the resistance 42 is employed to provide the proper retardance of the magnetism in the magnet 38, such retardance being in reality a choking action for such magnetism, thus controlling the pulsations produced by the magnetism of the magnet 38 on the disk 35, so that the contact will remain closed just long enough to produce the desired effect on the voltage to be regulated without causing any marked fluctuations in the voltage of the machines 12 and 6. Whenever the magnetism in the magnet 38 varies, a current is induced in the coil 40 and the resistance 42, which retards such change in magnetism and the degree of this retardance is controlled by the resistance 42.

When the potential of the armature circuit of the generator increases the voltage of the secondary of the transformer 48 will increase and cause more current to flow through the coil 45 thus increasing the magnetism in the magnet 44 and the latter will exert a greater pull on the disk 35 and thereby overcome the tension of the spring 37 and open the contacts 60 and 32. This will cause current to flow through the solenoid 30 and thereby cause the opening of the contacts 25 and 27 thus cutting the resistance 17 in series with the resistances 16 and 18 and current will then flow through the field coils 13 of the dynamo 12 in a direction to cause the latter to change its polarity from positive to negative. This will decrease the voltage of the armature circuit of the generator and at the same time cause the magnet 38 to give an impulse to the disk 35 in the direction to close the contacts 60 and 32 so that by the time the voltage of the armature circuit has decreased sufficiently to allow the spring 37 to overcome the pull of the magnet 44, the disk will already be moving in the direction to again close the contacts 60 and 32 thereby compensating for the delay due to the inertia of the disk. As soon as the contacts 60 and 32 come together the solenoid 30 is short-circuited and the spring 28 will then pull the contact 27 against the contact 25 thus short-circuiting the resistance 17 and the current will then flow through the field coil 13 of the dynamo 12 in a direction to cause the change of polarity of the latter from negative to positive which will increase the voltage of the armature circuit of the generator 1 and at the same time cause the magnet 38 to give an impulse to the disk in a direction to open the contacts 32 and 60 so that by the time the voltage of the armature circuit of the generator 1 has increased sufficiently to cause the magnet 44 to pull the disk 35 to an extent to overcome the spring 37 and open the contacts 32 and 60 the disk will already be moving in the direction to open these contacts. The regulator will continue to pass through cycles similar to the one just described as long as it is in operation.

Because of the compensation for the sluggishness of the response due to the inertia factor, the regulator is extremely sensitive to voltage changes in the armature circuit of the generator 1 and responds almost instantly to these changes. When the current in the armature circuit of the generator 1 increases the current in the coil 55 will increase and as the coil 55 is wound so that the magnetism produced by it will oppose that produced by the coil 45, then when the current increases in the armature circuit of the generator 1 a higher voltage will be required in this armature circuit to overcome the tension of the spring 37, and therefore the contact 60 will remain in engagement with the contact 32 for a longer time and thereby there will be maintained a higher voltage in the armature circuit of the generator 1.

In the system shown in Fig. 2 the magnet 44 is influenced only by the voltage element of the circuit to be regulated, while the coil 55 is replaced by another coil 65 connected by the conductors 54 to the secondary 53 of the transformer 52 and this coil is wound around a core 66 in operative relation to which is an armature lever 67 to which the conductor 31 is connected while the armature lever carries the circuit terminal 32 and is normally constrained away from the magnet 66 by a spring 68, the extent of movement being limited by a back stop 69. As the current increases in the coil 65 the magnet 66 will exert a greater pull on the armature 67 tending to wind up the spring 37 and it will therefore require a greater pull against the action of the spring 37 to cause the separation of the contacts 60 and 32 and for this reason a higher voltage will be required in the armature circuit of the generator 1 in order to overcome the spring 37. Therefore the voltage in the armature circuit will have to increase directly as the current of the armature circuit in order to keep the contacts 60 and 32 at the point of contact. The electromagnet 22 is replaced by a permanent magnet 22' which however acts in the same manner as the magnet 22. The magnet 38 is energized by two coils 70 and 71, the coil 70 being in series with the contacts 25 and 27 and the coil 71 is in parallel with these contacts. These two coils 70 and 71 are so wound that the magnetisms produced thereby are in opposite directions. When the contacts 25 and 27 come together then the coil 71 is short-circuited since the resistance of the coil 70 is very low and the current passing through the contacts will have also passed through the coil 70 which will magnetize the magnet 38 so that polar end adjacent to the disk 35 will be like one of the polar extremities of the magnet 22', but when the contacts separate then the coil 70 will be open-circuited and the coil 71 will receive all the current passing through the field of the exciter 2 as modified by an adjustable resistance 72 bridged across the circuit between the exciter and the coil 71.

The action of the magnet 38 and of the magnet 22' on the disk 35 is the same as already described with reference to the showing of Fig. 1 and need not be here repeated.

When the system shown in Fig. 2 is in operation current flows from the secondary of the transformer 48 through the coil 45 thereby magnetizing the magnet 44 and this causes the disk 35 to rotate in a direction to separate the contacts 60 and 32 against the action of the spring 37 as described with reference to Fig. 1. When the voltage of the transformer 48 rises sufficiently to cause the separation of the contacts 60 and 32 current will flow from the positive field main 7, through 19, 63 and 31 to the coil 30 thence through the resistance 33 and conductor 20 to the negative exciter main 8. This will cause the energization of the coil 30 and the opening of the contacts 25 and 27 against the tension of the spring 28. This will throw the resistance 72 in series with the field coil of the exciter which will cause a decrease of the voltage supplied to the field of the generator 1 and at the same time increase the current supplied to the coil 71 and decrease the current supplied to the coil 70. This causes the change of the magnetism of the magnet 38 so that the pole adjacent to the disk 35 will be like the pole of the magnet 22' remote from the arm 59 of the disk 35. While the magnetism of the magnet 38 is passing through the zero value the resultant pole on the side of the disk 35 opposite the pole at the end of the magnet 38, being like the pole of the magnet 22' adjacent to the arm 59 will give the disk 35 an impulse in the direction to close the contacts 60 and 32 so that by the time the voltage of the armature of the generator has responded to the decrease of voltage supplied to the field by the exciter the disk will already be moving in the proper direction to again close the contacts 60 and 32 which when closed will short circuit the coil 30 and thereby de-energize the latter and permit the spring 28 to bring the contact 27 into engagement with the contact 25 establishing a low resistance path through the coil 70 and around the resistance 72 thus permitting the application of the full voltage of the exciter to its field which will increase the voltage supplied to the field coils of the generator 1. At the same time the contacts 25 and 27 short circuit the resistance 72 current will pass through the coil 70 and the voltage between the conductors 24 and 26 will decrease thus allowing the influence of the coil 70 to overcome that of the coil 71 on the magnet 38 and thereby there will be produced a pole at the end of the magnet 38 adjacent to the disk 35 like the pole of the magnet 22' remote from the arm 59. But while the pole of the magnet 38 is passing through the zero value the resultant pole on the side of the disk opposite the magnet pole will be like the pole of the magnet 22' adjacent to the arm 59 and thus there is given to the disk 35 an impulse in a direction to move the contact 60 away from the contact 32. Thus by the time the voltage of the armature of the generator 1 has responded to the increased voltage supplied to the field coils by the exciter 2 the disk 35 will already be moving in the direction to open the contacts 32 and 60 thus preventing the action of each contact from lagging behind the changes of voltage in the armature circuit of the generator 1 because of the inertia of the moving element of the contact maker.

When the current in the armature of the generator 1 increases the current supplied to the coil 65 by the transformer 52 will exert a greater pull on the armature 67 which will move the contact 32 toward the contact 60 and more current will be required in the coil 45 in order to overcome the spring 37 to a sufficient extent to open the contacts 32 and 60, therefore a greater voltage will be required in the armature circuit of the generator to maintain the contacts 32 and 60 at the point of contact and the regulator will operate to vary the voltage of the system in proportion to the current flowing in the armature circuit of the generator. This arrangement is especially desirable where the power factor of the system varies since the magnetic fields of the magnets 44 and 66 are remote from each other and their influence on the contacts 32 and 60 will not be affected by the phase relation of the current and the voltage in the armature circuit of the generator 1. If the coils 45 and 65, embrace the same magnetic field, so that the coil 65 opposes the coil 45, then, when the current in coil 45 is 180° out of phase with the current in the coil 65, the coil 65 would produce the greatest effect on coil 45, considering in the present case that 100 per cent. is the power factor. However, the line drop, which the coil 65 is to compensate for, is less at 100 per cent. power factor than it is for a lagging current, and as in practice the current very seldom, if ever, leads the electromotive force, the coil 65 will give more correct compensation for line drop when its magnetic circuit is independent of that of the coil 45. Suppose, for example, that the generator 1 is of 5,000 K. W. capacity, then the exciter 2 will be capable of supplying 500 amperes at 120 volts, and the battery 3 will consist of fifty-six cells of 500 ampere capacity. The booster 6 will have a capacity of 500 amperes at 25 volts thus giving the regulator a range of 50 volts since the booster works in both directions. The dynamo 12 supplies the current for the field coil of the booster 6 which current will be about five amperes at 100 volts. The resistances 16, 17 and 18 will have a carrying capacity of, say, five amperes and, their ohmic resistance will be so proportioned to each other and to the field coil 13 that when the contacts 25 and 27 are open sufficient current will flow through said coil 13 to cause the dynamo 12 to generate 100 volts from its armature in one direction, but when the contacts 25 and 27 are closed then sufficient current will flow through the field coil 13 to cause the dynamo 12 to generate 100 volts from its armature in the other direction. The sum of the resistances 17 and 18 is greater than the resistance 16, but resistance 16 is greater than resistance 18 when the neutral tap is taken from the middle point of the battery 3. The exact value of the resistances 16, 17 and 18 depends upon the resistances of the field 13 and the voltage of the battery 3. The resistance 33 will be about 100 ohms thus limiting the current flowing through the contacts 32 and 60 to about one ampere. The magnet coils 21, 30, 39 and 45 will take about 25 watts, while the magnet coil 55 will take but a very few watts, say from one to five. The transformers 48 and 52 will be about 100 watts capacity.

It is to be understood that the foregoing example is not to be taken as limiting the invention in any manner whatsoever, and while the invention may be successfully practised with parts proportioned as set forth, other proportions and relations of parts are feasible.

What is claimed is:—

1. In an electric system, means for compensating for variations of voltage comprising a regulating generator having a field coil; means for establishing electromotive forces tending to produce opposing currents in the field coil; a resistance in opposition to each of said currents; a plurality of electromagnets, one of which is influenced by the voltage of the regulating generator; and means controlled by said plurality of electro magnets for varying periodically the resistance opposed to one of the said currents, the length of the period corresponding to the variations of voltage.

2. The combination in an electric circuit, of a regulating generator, having a field coil, means for establishing electromotive forces tending to pass opposing currents through the field coil, a resistance in opposition to each of said currents, a switch for changing the resistance opposed to one of said currents, an electromagnet for operating the switch, a switch in the circuit of the electromagnet, and means for compensating for the inertia of said last named switch.

3. In an electric system a regulating generator having an armature and a field coil, a battery having a plurality of terminals each of which is at a different potential and connected to the coil to establish electro-motive forces which tend to pass opposing currents through the field, a series of resistances interposed between the coil and the battery, a plurality of electro-magnets, one of which is disposed to be influenced by the voltage of the regulating generator, and means controlled by said plurality of electro-magnets for continually changing by a predetermined amount the resistance opposed to one of said currents.

4. In an electric regulator, a non-magnetic disk, means for producing a constant magnetic field in which the disk is suspended, a spring for normally holding said disk in one direction, and means for inducing electric current whose polarity is constantly changing at varying periods in the portion of the disk lying within said magnetic field, whereby said current and spring cause the disk to change its direction of movement at each reversal of said polarity.

5. In an electric regulator, a movable member, a contact mounted thereupon, another contact adapted for engaging said first named contact, means for producing a plurality of interlinked magnetic fields for oscillating said movable member, and means controlled by the engagement and disengagement of said contacts for varying one of said magnetic fields tending to separate said contacts when they are together and to close the contacts when they are separated.

6. In an electric regulator, a non-magnetic disk free to oscillate, means for establishing a constant magnetic field cutting said disk at an angle to the plane of oscillation, an electro magnet whose field cuts said disk at an angle to the plane of oscillation, and lies within a portion of said constant magnetic field, means controlled by the movement of said disk for varying the field of the electro magnet through zero, and means for varying the time of the zero value of the electro magnet relative to the time of reversal of the direction of motion of said disk.

7. In an electric regulator, a non-magnetic disk free to oscillate, means responsive to the electrical condition of the system to be regulated for moving said disk, means for establishing a constant magnetic field cutting said disk at an angle to the plane of oscillation, an electromagnet whose field cuts said disk at an angle to the plane of oscillation and lies within a portion of said constant magnetic field, means controlled by the movement of said disk for varying the magnetic field of said electromagnet through zero, and means for varying the time of the zero value of said electro magnet relative to the time of reversal of the direction of motion of said disk.

8. In an electric system, a generator, a dynamo in the field circuit of the generator, an exciter for varying the voltage of the dynamo, a switch for controlling the voltage of the exciter, an electromagnet for operating the switch, a pair of contacts for controlling the current supplied to the electromagnet, and means for moving one of the contacts toward and in contact with the other one of the contacts, the same being moved from engagement by the influence of the exciter.

9. In an electric system, a generator, a source of current for exciting the fields of said generator, a dynamo in series with said source, an exciter for the fields of said dynamo, and means responsive both to the voltage of the generator and to the voltage of the exciter for varying the voltage of the exciter, whereby the voltage of the dynamo is controlled.

10. In an electric system, a generator having an armature circuit and a field circuit, a source of current for the field circuit, a dynamo in series with said source, an exciter for said dynamo, means responsive to a characteristic of the armature circuit of the generator for controlling the voltage of the exciter, and means for producing a magnetic field dependent upon the voltage of said first named source and said exciter, whereby to compensate for the inertia of said first named means.

11. In an electric system, a generator having an armature circuit and a field circuit, a source of variable electro motive force in the field circuit, an exciter for said source, and means controlled both by the voltage of said exciter and by the voltage of the armature circuit of said generator for reversing the electro-motive force supplied to the field coils of the exciter.

12. In an electric regulator, a pair of contacts, a movable member for opening and closing said pair of contacts, an electromagnet for imparting impulses to the movable member at the initial opening and closing of the contacts, and a choking means for controlling such impulses.

13. In an electric regulator, a pair of contacts, a movable member for opening and closing said pair of contacts, an electromagnet for imparting impulses to the movable member at the initial opening and closing of the contacts, and a choking means for controlling the magnetism in the electromagnet.

14. In an electric regulator, a pair of contacts, a movable member adapted for opening and closing said pair of contacts, an electromagnet for imparting impulses to the movable member when the contacts are closed to separate the contacts, and a choking means for controlling such impulses.

15. In an electric regulator, a pair of contacts, a movable member adapted for opening and closing said pair of contacts, an electromagnet for imparting impulses to the movable member when the contacts are closed to separate the contacts, and a retarding means for controlling the impulses.

16. In an electric regulator, a pair of contacts, a movable member adapted for opening and closing said pair of contacts, an electromagnet for imparting impulses to the movable member when the contacts are open to close the contacts, and a choking means for controlling the impulses.

17. In an electric regulator, a pair of contacts, a movable member adapted for opening and closing said pair of contacts, an electromagnet for imparting impulses to the movable member when the contacts are open to close the contacts, and a retarding means for controlling the impulses.

18. In an electric regulator, a pair of contacts, a movable member disposed for opening and closing said contacts, an electromagnet for imparting impulses to the movable member when the contacts are closed to separate the contacts, and a coil including within its circuit a resistance for controlling the impulses.

19. In an electric regulator, a pair of contacts, a movable member for opening and closing said contacts, an electromagnet for imparting impulses to the movable member when the contacts are open to close the contacts, and a coil including within its circuit a resistance for controlling the impulses.

In testimony that I claim the foregoing as my own, I have hereto affixed my signature in the presence of two witnesses.

FORREST E. RICKETTS.

Witnesses:
JOHN T. FARDY,
STEPHEN D. BROADBENT.